United States Patent [19]

Takeuchi

[11] 4,189,717
[45] Feb. 19, 1980

[54] SYNCHRONOUS CONTROL APPARATUS IN MULTI-CIRCUIT SYSTEM

[75] Inventor: Eiichi Takeuchi, Iruma, Japan

[73] Assignee: Casio Computer Co., Ltd., Tokyo, Japan

[21] Appl. No.: 855,400

[22] Filed: Nov. 28, 1977

[30] Foreign Application Priority Data

Dec. 2, 1976 [JP] Japan .................... 51-145144

[51] Int. Cl.² .................... G06F 7/38; G04B 19/30
[52] U.S. Cl. .................... 340/365 E; 58/50 R; 340/147 SY; 364/707
[58] Field of Search ......... 340/147 R, 147 LP, 365 E, 340/147 SY; 364/707; 328/72, 63; 307/269

[56] References Cited

U.S. PATENT DOCUMENTS

| | | | |
|---|---|---|---|
| 3,737,637 | 6/1973 | Frankeny et al. | 328/72 |
| 3,771,130 | 11/1973 | Moses | 340/147 C |
| 3,857,101 | 12/1974 | Puckette et al. | 328/72 |
| 3,941,989 | 3/1976 | McLaughlin et al. | 307/269 |
| 3,955,355 | 5/1976 | Luce | 364/707 X |
| 4,070,630 | 1/1978 | Hepworth et al. | 307/269 |
| 4,109,315 | 8/1978 | Pan | 364/707 X |

*Primary Examiner*—Donald J. Yusko
*Attorney, Agent, or Firm*—Flynn & Frishauf

[57] ABSTRACT

A synchronous control apparatus in a multi-circuit system is provided with a first circuit which operates receiving a constant power supply and a second circuit which operates receiving a power supply at need, with a plurality of operation modes. The operation mode of the first or second circuit is selected by a mode selection circuit. When the mode selection circuit selects another operation mode, a synchronous control circuit provided in the first circuit transfers an initializing signal in synchronism with the first circuit to the second circuit. The second circuit is initialized in synchronism with the first circuit.

13 Claims, 8 Drawing Figures

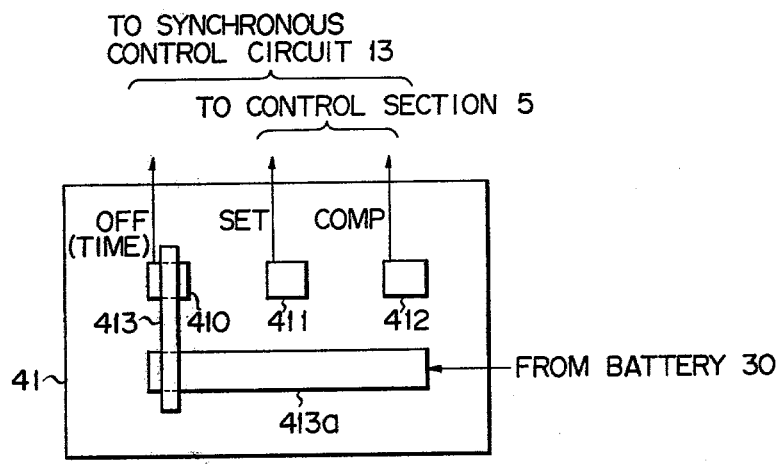
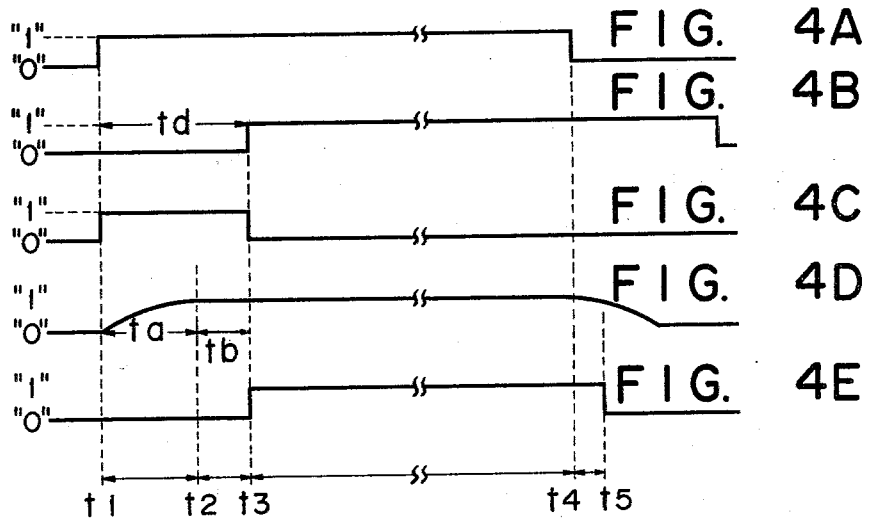

4,189,717

SYNCHRONOUS CONTROL APPARATUS IN MULTI-CIRCUIT SYSTEM

BACKGROUND OF THE INVENTION

The present invention relates to a synchronous control apparatus used for switching function modes of an electronic apparatus with a multi-circuit system driven by different power systems.

A small electronic computer with a time counting function (referred to as a calculator with clock) using a single display for both the functions, for example, has been practically used. Continuous drive of the display device consuming relatively large power is undesirable from a viewpoint of power saving. A countermeasure taken for this is that power is constantly supplied to the time counting block while power is supplied to the operation block only when the operation function is performed or the time counted value is displayed.

This kind of calculator has various functional modes; operation mode or stop mode, set mode for setting time, etc. When the functional mode is switched from one to another, it is desirable that the contents thus far stored or displayed is cleared to be set at the initial value. For example, the functional mode is set at the set mode to set desired time and then it is switched to the operation mode. In this case, under a condition that the computer is not set at the initial condition, if the function key is erroneously actuated, the calculator calculates the contents displayed on the basis of the instruction produced by the key actuation. Failing to take notice of this error, an operator enters new data into the calculator and operates the corresponding function key. In such an operation, the calculator operates on the entered data as the operand, even though he entered it as an operand to be on operated. The result of the calculation is erroneous. It is for this reason that the operator must set the calculator at the initial condition by the corresponding key actuation before its operation, each time that the operator switches the functional mode. This is troublesome in calculator operation.

Therefore, it is desirable to automatically set the respective circuits of the operation block at the initial condition when the mode is switched. By convention, the initial value setting circuit is comprised of a CR circuit including a resistor and a capacitor, and a waveshaping circuit. In mode switching, the constantly operating time counting block is asynchronous with the operating circuit initial-set through such an initial value setting circuit, since the time constant dependent on the CR is asynchronous with the timing of the internal operation thereof. It is impossible, therefore, to perform a correct transfer of data between the two circuit block.

Accordingly, an object of the present invention is to provide a synchronous control apparatus in a multi-circuit system in which an output signal of a mode switch for setting various modes is transmitted as an initializing signal to a second circuit system through a control circuit of a first circuit system which is constantly operating and thereby the output signal becomes the one synchronizing with the first circuit system whereby, when the mode switch is switched for mode change, the second circuit system may be initialized in synchronism with the first circuit system.

SUMMARY OF THE INVENTION

According to the present invention, there is provided a synchronous control apparatus in a multi-circuit system comprising: mode selecting means for selecting one of a plurality of operational modes; a first power source; a first circuit which is operable upon receipt of the power supplied from the first power source; the first circuit including synchronous control means for producing an initializing signal when the mode selecting means selects a new mode; a second power source; and a second circuit which operates in response to the power-on operation of the second power source which is made at need and includes initial condition setting means for receiving the initializing signal from the synchronous control means and synchronizing the second circuitry with the first circuitry.

As described above, the synchronous control apparatus according to the present invention is characteristically summarized: all the mode signals including "OFF (TIME)" mode are transferred to the second circuit, through the first circuit to which power is constantly supplied; the mode signal is used as an initializing signal; and the intervals between adjacent fixed contacts of a mode selector are each wider than the width of electrode of the movable contact. With such a feature, when the mode is switched, the second circuit system is initialized so that data previously stored is erased. The result is that there is eliminated that troublesome key operation for initializing the calculator at each mode switching, thereby eliminating erroneous operation.

Furthermore, since the initializing signal produced in mode switching is in synchronism with the first circuit, the first and second circuits are both synchronized with each other in operation, ensuring a correct data transfer therebetween.

BRIEF DESCRIPTION OF THE DRAWINGS

FIG. 3 schematically shows a mode selector used in the FIG. 1 circuit; and

FIGS. 4A–E are timing diagrams useful in illustrating the operation of the FIG. 2 circuit.

DETAILED DESCRIPTION

Figure 1:
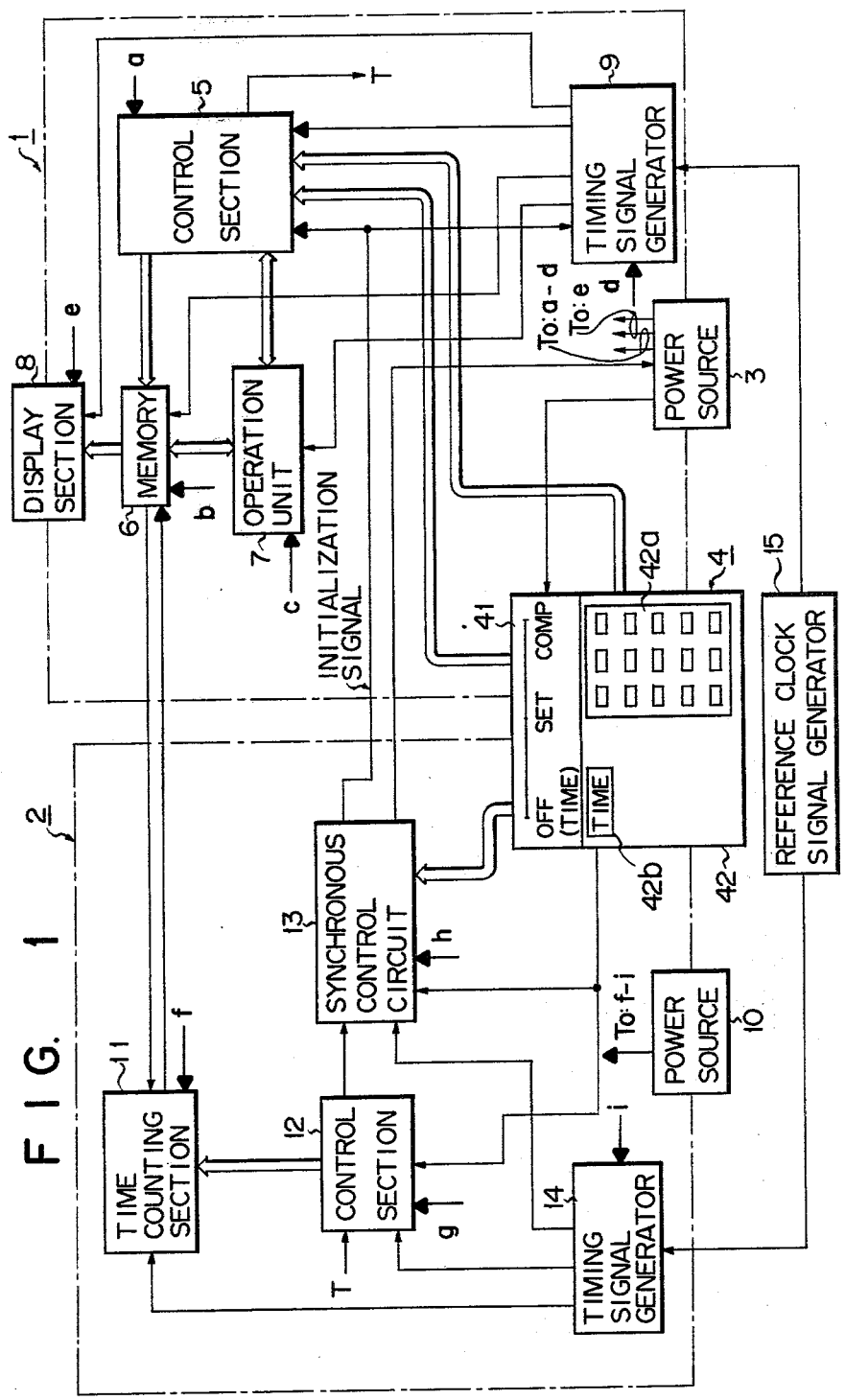
FIG. 1 shows a block diagram of a calculator with a clock which is an embodiment of the present invention.

Referring to FIG. 1 illustrating an entire circuit of a calculator with a clock, reference numeral 1 designates an operation block and numeral 2 a time counting block. The operation block 1 operates upon receipt of power from a power source 3 controlled by a power-on signal issued from the time counting block to be described later. An input unit 4 comprises a mode selector 41 which also is operable as a power switch, and a key input section including a group of operation keys 42a including functional keys and ten keys and a time key 42b. The input unit 4 produces mode select information and key input information to be directed to a control section 5 comprising an ROM, for example. Upon receipt of the information, the control section 5 produces numerical data, control signals for the operation block 1, and other control signals for the time counting block 2. The numerical data produced are loaded into a memory 6. Reference numeral 7 denotes an operation unit which operates under the control of the control section 5 to execute a calculation by using the numerical data stored in the memory 6, and loads the result of the calculation into the memory 6. Finally, the data loaded again into the memory 6 are read out therefrom to be applied to a display section 8. Reference numeral 9 designates a timing signal generator for synchronizing in operation the respective circuit portions of the operation block 1.

The time counting block 2 operates by power from a power source 10 which constantly supplies power independently of setting of the mode selector 41. A time counting section is designated by reference numeral 11. The time information is transferred from the memory 6 of the operation block 1 to the time counting section 11. Upon receipt of the time information, the time counting section 11 time-counts each one second or one minute through addition of "1". For simplicity, the addition of "1" will be referred to as "+1" operation. The "+1" operation is controlled by a control section 12. As shown, a transfer control signal T is applied from the control section 5 of the operation block 1 to the control section 12 of the time counting block 2. The transfer control signal T is used to control transfer of the time information from the memory 6 to the time counting section 11. A synchronous control circuit designated by reference numeral 13 receives output signals from the mode selector 41 and the time key 42b of the input unit 4. When a logical condition holds among signals supplied from the mode selector 41, the time key 42b and the control section 12, the synchronous control circuit 13 turns on the power source 3 and issues an initializing signal. The initializing signal is applied to the control section 5 and the timing signal generator 9. A timing signal generator 14 generates timing signals for synchronizing the operations of the respective circuit portions of the time counting block 2. The timing signal generators 14 and 9 have inputs which are connected to a reference clock signal generator 15 comprised of a crystal resonator, for example, and counts a signal generated from the reference clock generator 15 to produce various timing signals.

Figure 2:
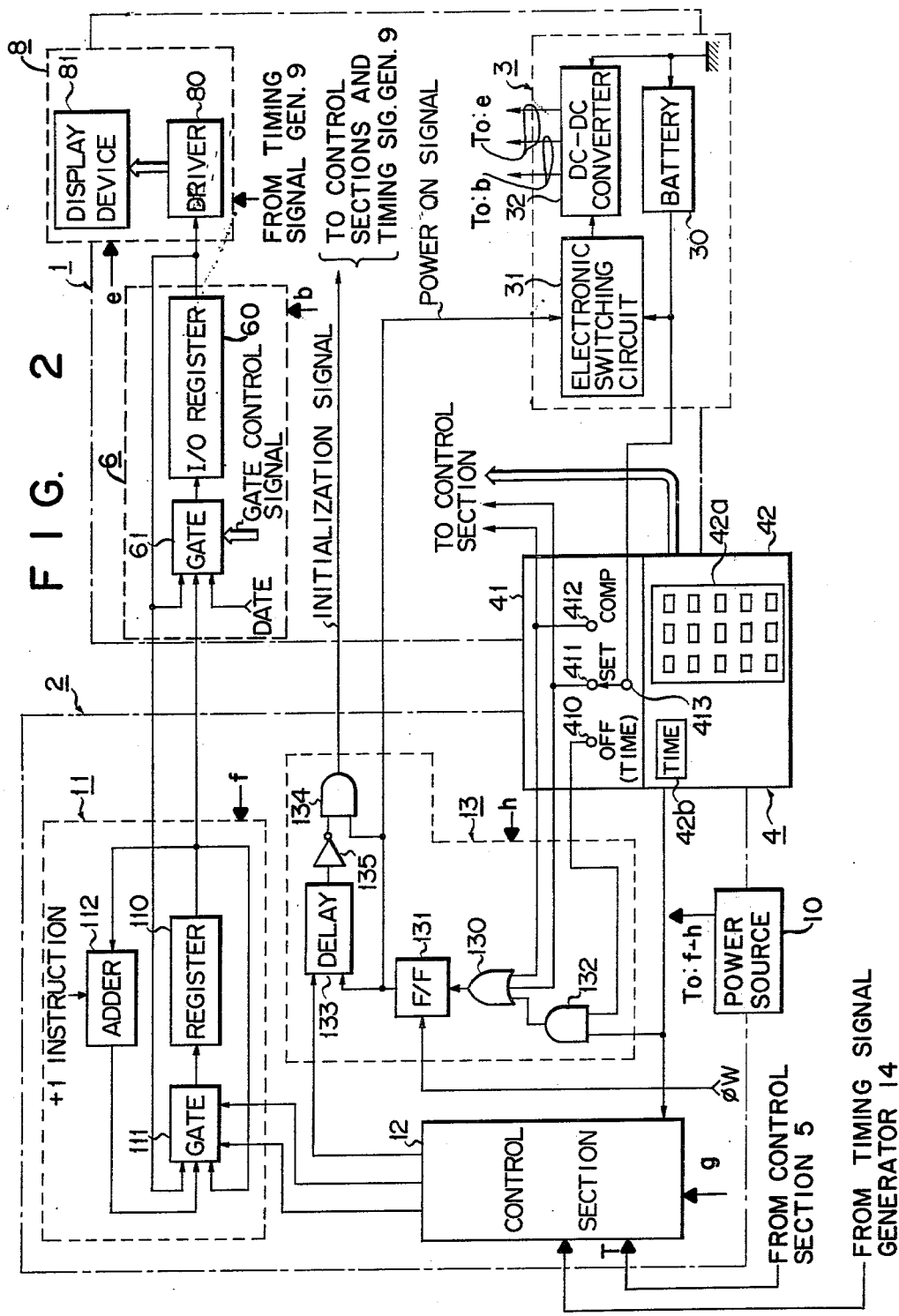
FIG. 2 shows a circuit diagram of major circuit portions of the FIG. 1 circuit.

Turning now to FIG. 2, there is shown a circuit diagram of major circuits of the invention. In FIG. 2, reference numeral 110 designates a time counting register of which the output returns to the input thereof through a gate circuit 111 controlled by the control section 12 to circulate therethrough, and goes to an adder 112. The adder 112 executes the "+1" operation in response to a "+1" instruction outputted from the control section 12 each one second or one minute and feeds the result of the addition to the time counting register 110 via a gate circuit 111.

Outputs from contacts 411 and 412 of a mode "SET" (mode specified when time is set) and a mode "COMP" (mode specified when the operation block 1 operates) of the mode selector 41, are applied through an OR circuit 130 to a synchronous circuit 131 operating in synchronism with a word clock signal $\phi_w$ (the word clock signal $\phi_w$ means a clock pulse produced each time the respective registers operate one cycle). Another mode "OFF (TIME)" (mode specified when the operation block 1 is not used) produces through a contact 410 an output which is in turn applied to an AND gate 132 together with the output of the time key 42b. The output of the AND circuit 132 is applied to the synchronizing circuit 131, through the OR circuit 130. A movable contact 413 connected with a battery 30 moves to contact the respective contacts 410 to 412 to produce outputs. The output of the synchronous circuit 131 is applied as a power-on instruction to the operation block 1. That is, the output is applied to an electronic switching circuit 31, a delay circuit 133 with a given time delay and an AND circuit 134. The output of the delay circuit 133 is applied to the AND circuit 134 through an inverter 135. The delay circuit 133, the AND circuit 134 and the inverter 135 constitute a called one-shot circuit in which the AND circuit 134 produces a one-shot pulse with a time interval corresponding to the time delay of the delay circuit 133. The one-shot pulse is applied as an initialization signal to the operation block 1. In the power source 3 of the operation block 1, a battery 30 outputs various voltages through the switching circuit 31. The electronic switching circuit 31 connected to a DC-DC converter 32 is conductive when it receives the power-on signal from the synchronizing circuit 131, to produce various voltages to the operation block 1. Reference numeral 60 designates an input/output register of which the output is inputted again to its input via a gate circuit 61 controlled by a gate control signal fed from the control section 5, and is applied to a driver 80 including a parallel-serial converter, a segment decoder and etc. The output of the input/output register 60 is applied to the gate circuit 111 of the time counting block 2 to permit data to be transferred to the time counting register 110. The gate circuit 61 receives input data fed from other registers in the memory 6, numerical codes fed from the operation unit 7 or the control section 5 and the output signal from the time counting register 110. The driver 80 properly processes the output signal of the input/output register 60 which is in turn applied to the display device 81 where the contents of the input/output register 60 is visualized.

The mode selector 41 will be detailed with reference to FIG. 3. The mode selector 41 is of the so called non-shorting structure. The movable contact 413 slides over an electrode 413a to selectively connect it with the fixed contacts 410, 411 and 412 of the respective modes. For this reason, the width of the movable contact 413 is slightly narrower than those of the fixed contacts 410, 411 and 412. The intervals between adjacent contacts 410, 411 and 412 are each wider than the width of the movable contact 413. With this arrangement, when the movable contact 413 moves along the fixed contacts 410, 411 and 412, there is a state that the contact 413 does not contact any one of the fixed contacts 410 to 412 and any one of these fixed contacts produces no output signal.

The explanation to follow is the operation of the above-described embodiment of the present invention. Referring now to FIGS. 4(A) to 4(E), there are shown a set of timing diagrams of the operation. Assume now that the movable contact 413 of the mode selector 41 is in contact with the fixed contact 410 of the "OFF (TIME)" mode and then is shifted to the "SET" mode. In the "OFF (TIME)" mode, the time counting block 2 operates, but the operation block 1 is in an inoperative condition (power-off condition). When the movable contact 413 is moved to depart from the fixed contact 410 to contact the fixed contact 411 ("SET" mode), the contact 411 provides an output signal which in turn is applied to the synchronous circuit 131 to make it synchronize with the clock signal, through the OR circuit 130. The synchronous circuit 130 suynchronizes an input signal inputted at any timing each word to produce an output signal at time $t_1$, as shown in time $t_1$, which is then applied to the electronic switching circuit 31 of the operation block 1. Then, the switching circuit 31 connects the battery 30 to the DC-DC converter 32 so that the power source 3 provides a voltage with a rise time $t_a$ from time $t_1$ to $t_2$, as shown in FIG. 4(D). The output of the synchronous circuit 131 is also applied to the delay circuit 133. Upon receipt of the output signal, the delay circuit 133 produces an output signal at $t_3$ after a given delay time $t_d$, as shown in FIG. 4(B). The output of the delay circuit 133 is applied to the AND circuit 134, together with the output of the synchronous circuit 131, through an inverter 135. Then, the AND circuit 134 produces a one-shot pulse with a width $t_d$ equal to the delay time, as shown in FIG. 4(C). The output of the AND circuit 134 is applied as the initializing signal to the respective circuits of the operation block 1. The operation block 1 is completely cleared after the time period $t_b$ (between time $t_2$ and $t_3$) shown in FIG. 4(D). As shown, the time period $t_d$ follows the rise time $t_a$ and the output voltage of the power source 3 is in a stationary state during this period of time $t_d$. At time $t_3$ of the end of $t_d$, the operation block 1 starts to operate. The output signal of the AND circuit 134 synchronizes with a word unit of the time counting block 2. For this reason, when the operation block 1 enters an operation mode, the start point of the output signal is in synchronism with the start point of the word unit. Therefore, the register 110 of the time counting block 2 operates fully in synchronism with the input/output register 60 of the operation block 1.

Let us consider now the case where the mode selector 41 is switched from "SET" mode to "COMP" mode. Assume now that data used in "SET" mode remains in the input/output register 60. Under this condition, the movable contact 413 is slid from the fixed contact 441 to the fixed contact 412. In the sliding, the movable contact experiences a state that it contacts none of the fixed contacts 411 and 412. At this time, the AND gate produces no output. Accordingly, the synchronous circuit 131 detects the "OFF" condition to cause the power source to be temporarily in an "OFF" condition. Immediately after this, the movable contact slides to contact the fixed contact 412 so that the OR circuit 130 produces again an output signal and the synchronous circuit 131 synchronizes with the clock signal $\phi_w$ to produce the power-on instruction. Further, the AND circuit 134 produces the initializing signal. As a consequence, the contents of the input/output register 60 is cleared, the operation block 1 restarts to operate in synchronism with the time counting block 2, to be ready for the execution of various operations.

The case to be discussed is that the mode selector 41 is switched from "SET" or "COMP" to "OFF (TIME)" mode. In this case, the output of the OR circuit 130 ceases at time $t_4$ in FIG. 4. Therefore, the switch circuit 31 becomes non-conductive and the output of the DC-DC converter 32 of the power source 3 falls with a slight retardation. This stops the operation of the operation block 1, after time $t_5$ and also the display at the display section. Under this condition, actuation of the time key 42b enables the AND circuit 132 of which the output is applied to the synchronous circuit 131 through the OR circuit 130, with the result that the operation block 1 is ready for operation because of its power-on, as in the previous case. At this time, the operation block 1 is set of the initial value, synchronizing with the time counting block 2, as in the case of the above-mentioned mode switching, and the control section 5 detects the condition when the power source is turned on, and detects that the present mode is "OFF (TIME)" and the time key 42b is operated. Then, the control section 5 instructs to input the contents of the time counting register 110 into the gate circuit 61, with the result that the contents of the time counting register 110 is transferred to the input/output register, through the gate circuit 61. The contents of the input/output register 60 is transferred through the drive circuit 80 to the display device 81 so as to be displayed. Subsequently, the actuation of the time key 42b is released so that the operation block 1 becomes its inoperative condition and the display goes out, as in the mode selection of "OFF (TIME)" by the mode selector 41. The time key 42b instructs to transfer the contents of the input/output register 60 into the time counting register 110 when the mode selector 41 is in "SET" mode. More specifically, the mode selector 41 is set at the "SET" mode and the operation key 42a is actuated to input a desired time in the time counting register 110. Then, the time key 42b is actuated. At this time, the control section 5 issues an instruction to transfer data of the input/output register 60 to the control section 12. The control section 12, upon receipt of this signal and the signal inputted directly from the time key 42b, controls the gate circuit 111 so that the contents of the input/output register 60 is loaded into the time counting register 110 through the gate circuit 111.

In the above-mentioned embodiment, the switch as shown in FIG. 3 is used for the mode selector 41. Note, however, that the essential requirements for the mode selector 41 is that the respective fixed contacts are disposed with intervals each wider than the width of the electrode of the movable contact, and that there must be a state that, when the movable contact shifts from one to another fixed contact, it necessarily contacts none of the fixed contacts.

The present invention thus far referred to relates to its application for a calculator with a clock; however, the present invention is applicable widely for those systems including a normally operable circuit system, a circuit system where power is turned on at need, and a mode selector for mode selection.

Various other modifications of the disclosed embodiment will become apparent to those skilled in the art without departing from the spirit and scope of the invention as defined by the appended claims.

What is claimed is:

1. A synchronous control apparatus in a multi-circuit system, comprising:
   mode selecting means (41) for selecting one of at least two operational modes;
   a first power source (10);
   a first circuit (2) which is always supplied with power from said first power source (10), said first circuit including first timing signal generating means (14) for generating timing signals to drive the first circuit and synchronous control means (13) coupled to said mode selecting means for producing an initialization signal in synchronism with a timing signal from said first timing signal generating means (14) every time said mode selecting means (4) selects one of said operational modes;
   a second power source (3); and
   a second circuit (1) which is supplied with power from said second power source (3) only responsive to selection of a given operational mode by said mode selecting means, said second circuit including second timing signal generating means (9) and control means (5);
   said synchronous control means (13) of said first circuit (2) being coupled to said second timing signal generating means (9) and control means (5) for feeding said intialization signal thereto for bringing them back to their respective initial conditions and synchronously controlling them responsive to said initialization signal.

2. The synchronous control apparatus of claim 1, wherein said synchronous control means (13) produces said initialization signal and a power-on signal, said power-on signal being coupled to said second power source (3).

3. The synchronous control apparatus of claim 2, wherein said second power source (3) comprises a battery (30), an electronic switch (31) and a DC-DC converter (32) coupled to said battery and electronic switch, said power-on signal being applied to said electronic switch.

4. The synchronous control apparatus of claim 1, wherein said initialization signal has a pulse width wider than the sum of the rise time of said second power source voltage and the time required for initializing said second timing signal generating means (9) and said control means (5).

5. The synchronous control apparatus of claim 1, further comprising input means coupled to both said first and second circuits (1,2), said input means including at least said mode selecting means and data input means.

6. The synchronous control apparatus of claim 5, wherein said mode selecting means includes at least a switch (41) for mode selection, and said data input means includes keys on a keyboard for data input.

7. The synchronous control apparatus according to claim 6, wherein said input means further includes a further specific operation key provided on said key board.

8. The synchronous control apparatus of claim 6, wherein power is constantly supplied to at least said mode selection switch.

9. The synchronous control apparatus of claim 6, wherein said mode selection switch (41) is of the non-shortcircuiting type and includes a movable contact (413) and fixed contacts (410-412), said fixed contacts being disposed with intervals therebetween which are wider than the width of said movable contact, and said synchronous control means (13) produces said initialization signal and said power-on signal when said movable contact of said mode selection switch does not contact any one of said fixed contacts.

10. The synchronous control apparatus of claim 6, wherein said mode selection switch selects one of a plurality of operational modes including a "POWER-OFF" mode.

11. The synchronous control apparatus of claim 7, wherein said mode selection switch selects one of a plurality of operational modes including a "POWER-OFF" mode.

12. The synchronous control apparatus of claim 11, wherein said synchronous control means includes means for detecting a logical product of an operation signal fed from said further key provided on said key board and a signal representing that said "POWER-OFF" mode is selected by said mode selection switch.

13. The synchronous control apparatus of claim 1, wherein said first circuit (2) comprises a time counting block which includes a controller, a time counter, a timing signal generator, and a synchronous control circuit, said first circuit constantly receiving power from said first power source; and said second circuit (1) comprises an operation block which includes a timing signal generator, a controller, an operation section, and a memory, said operation block receiving power from said second power source responsive to said selection of a given operational mode by mode selecting means.

* * * * *